(No Model.)
R. W. MILLER.
AUTOMATIC FIRE EXTINGUISHER.
No. 379,240. Patented Mar. 13, 1888.
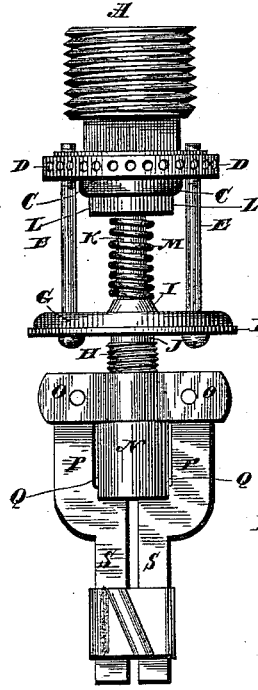
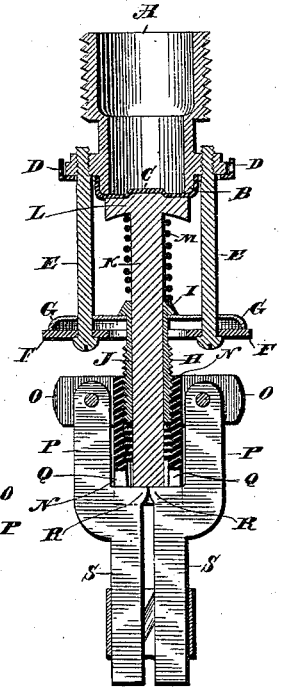
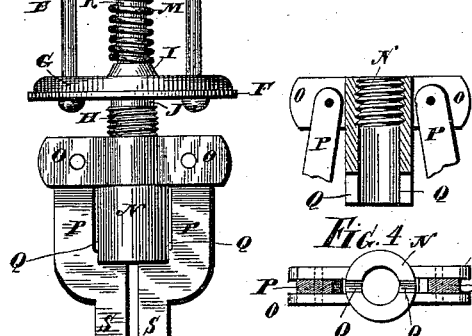
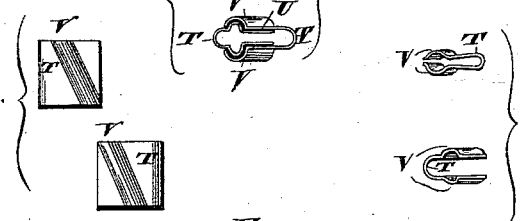
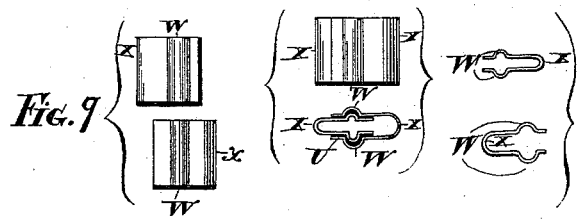
WITNESSES:
Chas. B. Shumway.
Chas. L. Brown Jr.
INVENTOR.
Richard W. Miller,
By Geo. D. Seymour,
Attorney.
N. PETERS, Photo-Lithographer, Washington, D. C.

UNITED STATES PATENT OFFICE.

RICHARD W. MILLER, OF NEW HAVEN, CONNECTICUT, ASSIGNOR TO THE NEW YORK AND NEW HAVEN AUTOMATIC SPRINKLER COMPANY, OF NEW YORK, N. Y.

AUTOMATIC FIRE-EXTINGUISHER.

SPECIFICATION forming part of Letters Patent No. 379,240, dated March 13, 1888.

Application filed January 17, 1887. Serial No. 224,520. (No model.)

*To all whom it may concern:*

Be it known that I, RICHARD W. MILLER, residing at New Haven, in the county of New Haven and State of Connecticut, have invented certain new and useful Improvements in Automatic Fire-Extinguishers; and I do declare the following to be a full, clear, and exact description of the same, reference being had to the accompanying drawings, which form a part of this specification.

My invention relates to an improvement in automatic fire-extinguishers, the object being to simplify and cheapen their construction and improve their general efficiency in use.

With these ends in view my invention consists in a sprinkler-head having certain details of construction and combinations of parts, as will be hereinafter described, and pointed out in the claims.

In the accompanying drawings, Figure 1 is a view in elevation of a sprinkler-head embodying my invention. Fig. 2 is a view thereof in vertical central section. Fig. 3 is a similar detached view of the nut. Fig. 4 is a reverse plan view of the said nut. Fig. 5 is a detached view of the tie in elevation and in plan. Fig. 6 is a view in side elevation of the two parts forming it. Fig. 7 is a plan view of such parts. Fig. 8 is a view in elevation and in plan of one of the modified forms which the tie may assume. Fig. 9 is a view in side elevation of the two parts forming the same, and Fig. 10 is a plan view of such parts.

The water-connection A, having the valve-seat B, the cup-shaped valve C, having the upright perforated water-distributing flange D, the adjustable pillars E E, the plate F, the spring-diaphragm G, located thereupon, the sleeve H, passing through the said plate and diaphragm and provided at its upper end with a flange, I, and at its lower end with screw-threads J, the spindle K, provided at its upper end with a head, L, and passing through the said sleeve, and the spiral spring M, encircling the spindle and interposed between the flange I and the head L, are of known construction.

As herein shown, my invention consists in a nut, N, arms P P, and a tie composed of U-shaped pieces T T, as shown. The said nut is screwed over the lower end of the said sleeve and provided upon the opposite faces of its upper end with slotted lugs O O. In the opposite faces of its lower end are formed vertical slots Q Q, which are in line with the lugs aforesaid.

The arms P P, which are preferably formed from sheet metal, are pivoted at their upper ends in the lugs O O of the nut, from which they hang in vertical planes. They are provided with inwardly-projecting shoulders R R, arranged to enter the slots Q Q and engage with the lower end of the spindle, and with tying-extensions S S, located in line with the said shoulders. These extensions set inwardly from the arms, whereby when the same are free they will of their own gravity swing outward, carrying their shoulders out of range with the spindle; also, by bringing the extensions together, as described, an economy of stock is effected both in the arms and in the tie by which they are held together. It is to be noted of the arms that their pivotal points, spindle-engagement points, and tying-points are in substantially parallel lines.

The U shaped tie-pieces are made of sheet metal, held together by a film, U, of solder, and provided each with an inclined corrugation, V, such corrugations interlocking when the two pieces are assembled and stiffening the tie and relieving the solder from a part of the strain imposed upon the tie.

In the modification shown by Figs. 8, 9, and 10 of the drawings the corrugations W W of the tie-pieces X X are formed at a right angle with the line of strain.

Under my invention, as herein shown, the diaphragm is put under the tension requisite to hold the valve to its seat as against the pressure of the water by screwing the nut upward on the sleeve, with the shoulders of the arms engaged with the lower end of the spindle, whereby the sleeve is pulled down against the diaphragm. The sprinkler-head is then left with the extensions of its arms held together by the tie, which is slipped over them. When the temperature to which the head is exposed passes the fusing-point of the solder in the tie, the solder melts and the tie falls apart and releases the arms, which separate. The spindle, being released, retires under the control of the spring encircling it, the valve opens, and water is admitted to the distributer, which sprays it over a wide area around the head.

By the extension of the shoulders R R of the arms into the slots Q Q of the nut, the arms are prevented from being laterally displaced and the shoulders disengaged from the spindle by any accidental blow which the sprinkler-head may receive.

Although the tension upon the diaphragm may represent many pounds of pressure, the leverage is such that the load falls very lightly upon the tie, which may therefore be made of light stock and bound together in such manner as to very readily separate under an abnormal temperature. At the same time the leverage insures a positive separation of the arms. When they are untied, all of these factors contribute to the reliability of the action of the device.

My improved tie is well adapted for use with the head described, but may be used in any other connection where available. On the other hand, any other suitable tie may be used upon the said head. I would therefore have it understood that I do not limit myself to the exact construction and arrangement of parts herein shown and described, but hold myself at liberty to make such changes and alterations as fairly fall within the spirit and scope of my invention.

I am aware that it is old to provide an automatic sprinkler-head with a nut carrying a plug held in place by soft solder and screwed upon the lower end of a sleeve, so as to engage the plug with the end of a valve-spindle projecting into the sleeve. I am also aware that it is old to make a sprinkler-head with an open frame carrying a pivotal two-armed lever and a tie for the same and threaded upon a nipple normally closed by a valve located within the frame and having a spindle adapted to engage with one arm of such lever, whereby by turning the frame the tension upon the spindle, and hence valve, is varied. I do not, therefore, broadly claim a screw construction, whether it is a nut or a frame, for varying the external pressure upon the valve of a spindle-head, but only the construction shown herein and its legitimate equivalents.

Having fully described my invention, what I claim as new, and desire to secure by Letters Patent, is—

1. In an automatic sprinkler-head, the combination, with a valve having a spindle, of a frame for such valve, a threaded sleeve connected with the frame and having the valve-stem extend through it, a nut screwing upon the sleeve, two arms connected with such nut, and one arm being movable and adapted to engage with the projecting end of the spindle, and a fusible tie for tying the two arms together, the said arms being independent of the frame and adapting the nut to be turned by hand to vary the external pressure upon the valve, substantially as set forth.

2. In an automatic sprinkler-head, the combination, with a frame, of a valve located therein and having a spindle projecting outward beyond the same, a slotted guard connected with the frame at a point within the projecting end of the spindle, a movable arm adapted to engage with the end of the spindle and to enter the slotted guard which is located between the end of the spindle and the pivot of the arm, an arm to which the movable arm is tied, and a fusible tie for tying the two arms together, substantially as set forth.

3. In an automatic sprinkler-head, the combination, with a valve having a spindle, of a frame for such valve, a sleeve through which the valve-spindle passes connected with such frame, a slotted nut screwed upon the sleeve, a movable arm connected with the nut and adapted to enter the slot therein and to be engaged with the end of the spindle, an arm constituting a tying-point for such movable arm, and a fusible tie connecting such arms, substantially as set forth.

4. In an automatic sprinkler-head, the combination, with a valve having a spindle, of a threaded sleeve through which the spindle projects, a rigid support for such sleeve, a nut screwing over the lower end of the sleeve and provided with two lugs located opposite each other, two arms respectively pivoted to the lugs of the nut and adapted to engage with the projecting end of the spindle, and a fusible tie for the lower ends of the arms, the said lugs and arms adapting the nut to be turned by hand to adjust the tension upon the spindle, substantially as set forth.

5. In an automatic sprinkler-head, the combination, with a valve having a spindle, of a threaded sleeve through which the spindle projects, a nut screwing upon the sleeve, two arms pivotally connected with the sleeve and adapted to fit around the lower end thereof and to engage with the projecting end of the spindle, and respectively provided with a straight tying-extension, such extensions coming close together when the arms are engaged with the spindle, and a fusible tie for such extensions, substantially as set forth.

6. In an automatic sprinkler-head, the combination, with a valve having a spindle, of an arm adapted to engage with such spindle, an arm to which the movable arm is tied, and a tie composed of two pieces of sheet metal provided with interlocking corrugations, forming a spring-lock parting under the pressure of the water, and normally united by solder, substantially as set forth.

7. In an automatic sprinkler-head, a tie composed of two pieces of sheet metal provided with interlocking corrugations, forming a spring-lock parting under the pressure of the water, and normally united by solder, substantially as set forth.

In testimony whereof I have signed this specification in the presence of two subscribing witnesses.

RICHARD W. MILLER.

Witnesses:
CHAS. B. SHUMWAY,
WILLIAM J. LUM.